Jan. 31, 1928.
S. B. ALLEN ET AL
1,657,910
ELECTRICALLY OPERATED REMOTE CONTROL INDICATOR
Filed Sept. 11, 1922
2 Sheets-Sheet 1
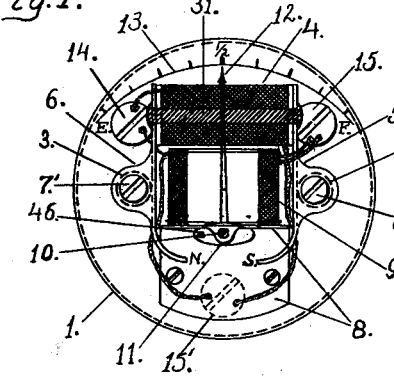
WITNESS:
INVENTORS.

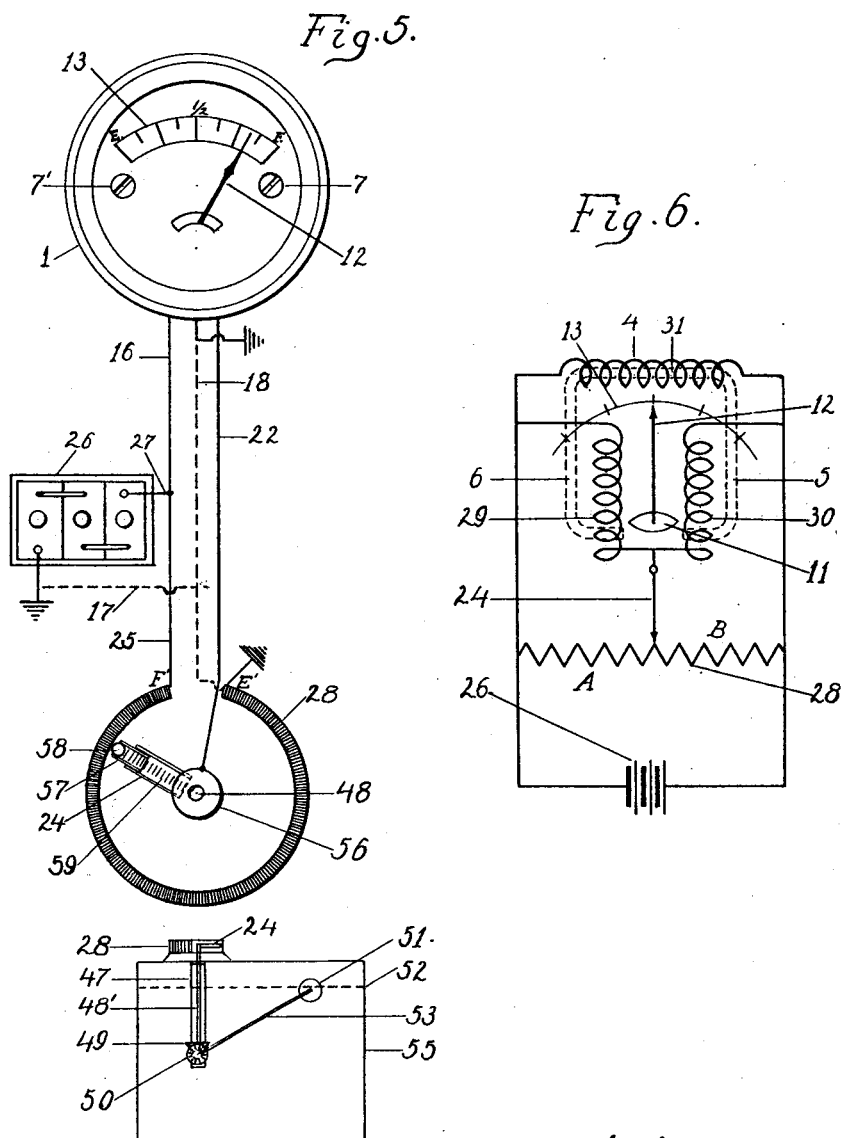

Patented Jan. 31, 1928.

1,657,910

UNITED STATES PATENT OFFICE.

STRATFORD B. ALLEN, OF FRAMINGHAM, AND LORNE ROBERT SUTHERLAND, OF BOSTON, MASSACHUSETTS, ASSIGNORS, BY MESNE ASSIGNMENTS, TO THE CLEVELAND TRUST COMPANY, TRUSTEE, OF CLEVELAND, OHIO, A CORPORATION OF OHIO.

ELECTRICALLY-OPERATED REMOTE-CONTROL INDICATOR.

Application filed September 11, 1922. Serial No. 587,608.

The object of our invention is to provide an instrument whereby measurements or indications, may be established electrically at a distance from the origin of the condition to be measured or indicated, not being effected by a considerable variation in voltage of the actuating current, for illustration, such as would be the case in using a storage battery whereby variable conditions exist, namely, no load, heavily loaded and maximum voltage while charging, also in long distance transmission where there is likely to be a considerable fluctuation in line voltage.

The distinguishing feature of our invention is that it is not appreciably affected by wide voltage variation provided that the minimum voltage supplied is sufficient to render a full deflection of the pointer over the entire scale of the instrument. We attain these objects by means of the mechanism illustrated in the accompanying drawing, in which:—

Figure 1 is a plan view of the essential parts of our electric indicator and their relation to each other, the coils being shown in cross section.

Figure 2 is a side elevation in cross section of the said indicator.

Figure 3 is a diagram of the complete system.

Figure 4 is a diagram of a similar system incorporating our principle but using a divided or split circuit.

Figure 5 is a diagram showing the application of our device to the measurement of enclosed and stored fluids.

Figure 6 illustrates diagrammatically the basic principles of our device, showing the analogy between the operation of our indicating system and that of the Wheatstone bridge circuit. In this diagram the "known" and "unknown" resistances and galvanometer of the usual bridge circuit are replaced by the double-wound solenoid or two electro-magnets in combination with means for indication, substantially as shown.

Similar reference numbers refer to like parts throughout the specification and drawings.

Our invention consists primarily in the following instrumentalities:—

In Figures 1 and 2, the indicator comprises a base 1 on which are fastened pillars 2 and 3, which support the coil 4 through the means of the soft iron pole pieces 5 and 6 which in turn are held firmly to the ends of the coil 4 by its soft iron core 31, said core being headed after passing through the pole pieces. This combination constitutes the exciter field, and is secured to the pillars 2 and 3 by the screws 7 and 7'. The angular frame 8 supports the double-wound solenoid 9 as well as the moving element comprised of the pivot 10 in its bearings, the armature 11 and the pointer 12 which moves over the scale 13. The screws 14 and 15 are two terminals of the indicator. The third terminal 15' may be omitted by grounding its connections to the base 1 where conditions permit a return path from the said base to the battery or energizing source.

The soft iron pole pieces 5 and 6 are of relatively small cross section at their extremities in order that they will become magnetically saturated and establish a relatively strong leakage field in the vicinity of the pole pieces. The opposed end portions of the respective pole pieces are also sufficiently malleable when made of soft iron, to permit the adjustment of the pole pieces relative to the indicator vane for purposes of calibrating the instrument by changing the relation of the pole pieces to the indicator vane.

In Figure 3 the same indicator illustrated in Figure 1 is represented diagrammatically. In addition, we show a source of electrical energy, in this case a battery (an alternating current can be substituted) and an adjustable bridge resistance 28 operated by means of a sliding contact arm 24.

One method of actuating the contact arm 24 is illustrated in Figure 5 in which is shown a schematic diagram of our device in operation.

It is important that the action of a master float or other moving object such, for example, as an elevator, penstock gate, etc., be suitably transmitted to the moving contact arm 24 in such a manner and in such ratio that the said contact arm will touch the resistance unit 28 at a point bearing a direct relation to the position of the master moving element, it being presumed that the latter will at all times be somewhere between two fixed points of limitation.

In Figures 3 and 4 for clearness of illustration, the windings of the several magnets and solenoid are shown as a few turns of wire. In practice they consist of many turns of fine wire wound to a considerable resistance, so that the current consumption of the indicator will be reduced to a minimum.

The following serves as an explanation of the diagram shown in Figure 3:

Leading from the positive terminal of the battery 26, the current which energizes the coil 29 flows through the conductors 27, 16, terminal 14, thence through coil 29 to terminal 15, conductor 22, sliding contact arm 24, through the bridge resistance 28 to ground, or, if a three wire system is preferred, through conductors 23 and 17 to the negative terminal of the battery 26.

The coil 30 is wound upon the solenoid 9 in series with coil 29, and with the same number of turns as the latter. As a matter of convenience the two wires may be wound at the same time. However, in operation they are in opposition, since the current flow is opposite in direction in the two windings. Thus in coil 30 the current flows from the positive terminal of the battery 26 through conductors 27 and 25, thence through the bridge resistance 28, sliding contact arm 24, conductor 22, terminal 15, coil 30 to ground, or, in case a three wire system is preferred, through conductors 19, 18 and 17 to the negative pole of the battery 26.

During operation of the indicating system, current flows throughout the length of the bridge resistance 28, since said resistance is connected directly across the battery 26.

With the sliding contact arm 24 located as shown, namely, at the middle point of the bridge resistance 28, it is fair to assume that the current flow in the coils 29 and 30 is equal and opposite in direction, there being no flow of current through the sliding contact arm 24 when at the middle point of the bridge resistance 28. Since the ampere turns of the said coils are equal, their magnetic fields are equal, but opposite, and consequently solenoid 9, comprising coils 29 and 30, is neutral inasmuch as the two opposed fields cancel. If no other means of control existed, the armature 11 would not be under control under the above condition, and the pointer 12 would stand at E on the scale 13, due to the fact that it is so balanced by the weight 46 that the moving element comprising the armature, pivot and pointer 12, tends to take a rest position at the said point E or zero, as the case may be.

In order that the pointer may be so controlled that it will indicate one-half scale under the above condition to correspond to the position of the sliding contact arm 24 on the bridge resistance 28, a permanent magnet might be utilized as in the so-called "fixed coil ammeters" but for the objection that cutting off the energizing current would not return the pointer to E or zero, the pointer in this case remaining at half scale indication. Further, the use of a permanent magnet for the establishment of an exciter field would result in serious error if not false indication upon slight fluctuations of voltage in the energizing circuit. We obviate these errors and undesirable conditions in our invention by the use of an electro-magnet comprised of a coil 4 which energizes the soft iron core 31 and the pole pieces 5 and 6. This coil 4 is connected directly across the battery 26, its energizing current flowing from the positive of the battery 26 through the conductors 27, 16 terminal 14, conductor 20, the coil 4, conductor 21 to the ground, or in case a three wire system is employed, through conductors 32, 18 and 17 to the negative terminal of the battery 26.

By sliding the contact arm 24 to the end F' of the bridge resistance 28, the current in the coil 30 will be greatly increased, since the half section of the bridge resistance 28 has been cut out, tending to throw coil 30 directly across the battery as the contact arm 24 approaches F'. Likewise the current flowing in coil 29 will be correspondingly decreased, owing to the fact that the movement of the contact arm 24 toward the point F' on the bridge resistance 28 reduces the potential drop between the terminals 14 and 15 of the coil 29, said potential approaching zero at the position F' of the contact arm 24. In other words, this position of the contact arm results in a short circuiting of the coil 29.

In operation of the device the exciter field N—S generated by the magnet 4 tends to maintain parallel to itself the major axis of the armature 11 when the current flows equally but oppositely in the coils 29 and 30 of the solenoid 9, in which case the exciter field N—S is the only field acting on the armature 11. With the current flowing oppositely in direction through the coils 29 and 30, respectively, of the solenoid 9, it will be seen that when one of these coils (29 or 30) is the more strongly energized, the armature 11 will rotate to a position where its major axis is approximately parallel to the resultant of the fields generated by the exciter poles N—S and the solenoid 9.

Thus, if the relation between the coils 29 and 30 results in a north pole at the lower end of the solenoid 9, distortion of the field N—S will follow, bringing about the establishment of a resultant field between the solenoid 9 and the pole S of the exciter field, to which the armature 11 will become aligned, such process of alignment swinging the pointer 12 to F on the scale 13. In this case it is assumed for the purpose of illustration that the contact arm 24 is toward the end F' of the resistance 28.

If, on the other hand, the sliding contact arm 24 is moved along toward the end E' of the resistance 28, the pointer 12 will move proportionately along the scale 13, being virtually locked electrically to the contact arm 24, although the mechanism comprising the resistance 28 and the sliding contact arm 24 may be located at a point remote from the indicator. The operating current may vary in voltage without materially affecting the accuracy of operation of the indicator; furthermore, either direct or alternating current may be used as a source of energy for the operation of the indicating system aforesaid.

In Figure 4 there is illustrated a variation in the mechanical construction of the indicator, as well as in its detailed application to a resistance having the qualities of a voltage divider. Shown diagrammatically, this indicator comprises a pointer 12 operatively connected to a pivotally mounted armature 11, said pointer arranged to move over the scale 13. The armature 11 is actuated by the field poles 41 and 42, and the common pole 43. Poles 41 and 42 are separately connected to the lower ends of the electro-magnets 35 and 39, the common pole 43 connecting or bridging the upper ends of the said electro-magnets. The electro-magnets 35 and 39 are wound with approximately the same number of turns of wire, and are so connected that they energize the pole pieces 41 and 42 with relatively opposite polarity, thus establishing a field between poles 41 and 42 which controls the movement of the armature 11.

In operation, current flows from the positive terminal of the battery 26 through conductor 37 to the contact arm 24; thence dividing at the junction of said contact arm and the resistance 28 and flowing divergently through said resistance 28, conductors 36 and 40, the electro-magnets 35 and 39, conductors 34 and 38, returns to the negative pole of the battery 26 through the conductor 33. With the contact arm 24 at the middle point of the resistance 28, it is evident that the voltages supplied to the electro-magnets 35 and 39 will be equal, rendering the common field pole 43 neutral in its relation to the field poles 41 and 42. Under the condition just described, the major axis of the armature 11 will tend to hold a position parallel to the field generated by the field poles 41 and 42.

Upon movement of the sliding contact arm 24 either side of the middle point of the resistance 28, the voltage supplied to one of the two electro-magnets is increased as the other is decreased, thereby causing the common pole 43 to become oppositely charged in relation to the stronger of the two field poles, and tending to rotate the armature 11 to a position of the resultant field. And since the actuating and exciting field coils are common, being comprised in the electro-magnets 35 and 39, any variation in the voltage supplied to them will be compensated for in the relative strengths of the fields generated by the said electro-magnets, causing the same angle of the resultant field to be maintained for a given setting of the sliding contact arm 24 on the resistance 28.

Figure 5 illustrates one application of our device to the measurement of enclosed or stored fluids. As here shown, the resistance 28 is circular in shape, and the sliding contact arm 24 comprises a supporting hub 56, a collar 57 in which is mounted a ball contact 58. In operation the rotation of the contact arm 24 about its axis 48 and on the resistance 28, causes proportional variation in the potentials across the conductors 16 and 18, and conductors 18 and 22, resulting in differential energization of the actuating coils contained in the indicator, thereby causing the pointer 12 to change position according to the position of the sliding contact arm 24.

Below Figure 5 is shown one method of adapting our transmitter to a tank containing fluid to be measured. The sliding contact arm 24 and the resistance 28 are suitably mounted upon the tank 55. The said contact arm is here shown operatively connected to a shaft 48' supported by a frame 47, and through bevel gears 49 and 50 and the arm 53 to a float 51, the said float rising and falling with the surface of the liquid 52 contained in the tank 55. Thus it will readily be seen that upon varying the height of the liquid 52 in the tank 55, the float mechanism will operate the transmitter comprised of the resistance 28 and the sliding contact arm 24; and, by means of the supply circuit comprising a battery 26 and the conductors 27 and 17, bring about the co-ordinating of the position of the pointer 12 with the operatively connected float 51 and the contact arm 24.

Figure 6 is a diagrammatic illustration of our indicating system, in which it is intended to point out its similarity in general principle to the Wheatstone bridge circuit. An energizing source is represented by the battery 26 across which is connected the bridge resistance 28 and the coils 29 and 30 in series which, for purposes of illustration, may be considered as replacing the "known" and "unknown" resistances of the ordinary bridge circuit. A slidable contact arm 24 is connected from the middle point between the two coils 29 and 30 to the resistance 28. In place of the galvanometer ordinarily employed to indicate balance in a bridge circuit, and usually connected between the sliding contact of the bridge and the junction of the "known" and "unknown" resistances, there are substituted the actuating coils 29 and 30 which, in conjunction with the exciter coil 4 and field core 31, cause the pivotally mounted armature 11 and the pointer 12 to move in relation proportionate to the lengths A and B on the bridge resistance 28. Thus a condition of balance or unbalance of the circuit is indicated by means of a mechanism comprised of the component parts of a bridge circuit, operating upon the same general underlying principles of a Wheatstone bridge.

While the action of our device is in some respects similar as regards the indicator, to the conventional fixed-coil ammeters and voltmeters commonly used in automotive practice, it is easily recognized that its means of control are vastly different from the latter in that no permanent magnet is employed as an exciter, such permanent magnet employed in the construction of fixed-coil meters usually maintaining the pointer at the center of the scale when no current is flowing. Whereas, in our device means are provided for returning the pointer to one end of the scale when the supply current is cut off, the exciter field being de-energized and releasing the armature when the supply circuit is broken. Also, variations in voltage do not materially affect the indication of our device, since field strengths proportionate to the voltage applied are maintained between the exciter field and the actuating coils. This would not be true in case a permanent magnet were employed as the exciter. In view of the foregoing explanation of our indicating system and its operation, it should be borne in mind that this indicator is not intended for the direct measurement of current or potential, but rather as a relay or remote control indicator applicable to the transmission of measurements to a point remote from the source of said measurements.

While we have shown and described two forms of our invention we do not feel that they are modifications in the strict sense of the word; they are only forms of the same invention designed for different purposes; and while the forms shown and described exhibit our preferred construction we do not desire to be considered as limiting ourselves to them alone. The principal feature of our invention resides in the fact that the exciter field, being an induced rather than a permanent field, creates a condition of proportionate relation between itself and the field generated by the actuating coils under conditions of variation or reversal of potential, the resultant effect of which insures uniformity of performance under working conditions.

We claim:

1. In an indicating system, the combination of a base, an armature of the magnetic vane type pivoted on said base, an indicating member operatively connected to the pivotally mounted armature, an energizing source, an exciter magnet connected across the energizing source, a bridge resistance, a solenoid, for said armature having two parallel windings producing opposing magnetic fields, the adjacent ends of said windings are connected together at a common terminal, the opposite ends of said windings being separately terminated and connected to the opposite ends of the bridge resistance which in turn is connected across the energizing source common to the exciter magnet and the solenoid windings aforesaid, and a slidable contact operable with respect to the said bridge resistance and connected to the common terminal of the parallel windings of the double-wound solenoid.

2. Apparaus for indicating at a distance the position of an element which has travel, comprising an electro-magnet fixed in position and in a circuit of substantially constant resistance producing a magnetic field; two equal control coils fixed in position and oppositely energized from separate variable circuits in accordance with the movement of said element having travel so as to affect oppositely the direction of the magnet field; and an indicating armature arranged to respond to variations in the direction of said field; the said variable circuits being from the same source of electric energy as the circuit for the electro-magnet; and means responsive to the element having travel for varying the currents in the variable circuits whereby the armature is varied in direction in accordance with the travel of said element.

3. Apparatus for indicating at a distance the position of an element which has travel, comprising a source of electric energy, an electro-magnet with poles fixed in position and energized from said source by a circuit of substantially constant resistance, an indicating armature in the field of said electro-magnet; two additional circuits from the same electrical source as that of the electro-magnet and each including a coil, the said coils being formed of two wires wound together on the same core and having the same magnetic axis; the magnetic axis of said coils being transverse to the aforesaid electro-magnet field, means for varying the current flowing through said additional circuits in accordance with the position of said element which has travel, the magnetic effect of said coils being opposed in direction.

4. Apparatus for indicating at a distance the position of an element which has travel, comprising a source of electric energy, an electro-magnet having a pair of pole pieces of magnetic material energized from said source; an indicating armature movable in the magnetic field of said magnet; two variable circuits energized from the same electrical source as the magnet and each including a coil having a non-magnetic core arranged transverse to the axis of the field and between the poles of the magnet, means for varying the currents in the circuits in accordance with movement of the element having travel; said coils being wound to have their fields mutually opposite; the said poles of the magnet being thin and small relative to the magnetic flux to be carried, whereby there is a large leakage field between the poles whose normal direction is controlled by these poles; said armature being out of alignment with said poles and positioned in the leakage field outside the axis of the direct field.

5. Apparatus for indicating at a distance the position of an element which has travel, comprising a source of electric energy, a magnet adapted to produce a magnetic field of fixed direction; an indicating armature of the pivoted magnetic vane type positioned in the aforesaid magnetic field; a pair of differentially energized circuits each including a coil, a source of energy; means for varying the current in said coils in accordance with the element having travel; the said coils having non-magnetic cores arranged transverse to the axis of the field between the poles of the magnet and being wound to have their fields mutually opposite in direction; the said poles of the magnet being thin and small relative to the magnetic flux to be carried whereby there is a large leakage field whose normal direction is controlled by these poles; the armature having a pointer arranged to stand at half-scale when the currents in the two coils are equal.

6. An indicating system comprising a source of electric energy, a resistance element connected in shunt relation with the source of energy, a contact member, means for moving said contact member along said resistance element in accordance with changes in the thing being indicated, a magnetically actuated indicating mechanism remote from said resistance element, an energizing coil connected in shunt relation with respect to said source and producing a magnetic field proportional to the voltage of said source of energy, and a pair of connected actuating coils concentrically wound in opposed relation and connected in series relation across said source of energy and having their common point electrically connected to said contact member, said indicating mechanism being actuated by the combined influence of said energizing and said actuating coils.

7. An indicating system comprising a source of direct electric current, a resistance element connected in shunt relation with the source of energy, a contact member moved along said resistance element in accordance with changes in the thing being indicated, electromagnet means producing a magnetic field proportional to the voltage of said source, a second electromagnet means controlled by the position of said contact member on said resistance element producing a magnetic field angularly related to said first field and reversible in polarity for extreme positions of the contact member, and magnetically responsive indicating mechanism controlled by the combined influence of said magnetic fields.

8. An indicating system comprising a pair of concentric and co-axial windings connected in series relation, a source of direct electric current for energizing said windings, a circuit energized from said source of current including a resistance element connected to a point common to each of said windings, means for varying the position of the connection to said resistance element, a third winding energized from said source and producing a magnetic field in angular relation to the magnetic field produced by said pair of windings, and an indicating mechanism actuated by the combined influence of said windings in accordance with the variations in the position of the connection to the said resistance element.

9. An indicating system comprising a source of direct electric current, a pair of windings wound in opposed relation and connected in series relation across said source of current, means connected to the common point of said windings for differentially varying the degree of excitation of said windings, a third winding energized from said source of energy and producing a magnetic field proportional to the voltage of said source and in quadrature with the magnetic field produced by said pair of windings, and a magnetically responsive indicator adapted to be actuated by the combined influence of said pair of windings and said third winding.

10. An indicating system comprising, a source of direct electric current, a pair of windings producing opposed magnetic fields, means for differentially varying the degree of excitation of each of said windings, the individual excitations of said windings being also proportional to changes in the voltage of said source, a third winding energized from said source and producing a magnetic field that is proportional to the voltage of said source and in angular relation to the magnetic field produced by said pair of windings, and magnetically responsive means actuated by the combined influence of said pair of windings and said third winding actuated thereby to a plurality of indicating positions.

11. An indicating system comprising a source of direct electric current, a pair of concentric and co-axial windings connected in series relation across said source of direct current, means for differentially varying the excitation of each of said windings, a third winding energized from said source and producing a magnetic field, in angular relation to the field produced by said co-axial windings and directly proportional to the voltage of said source, and a magnetically responsive indicator actuated by the combined influence of said windings.

12. An electro-magnetic indicating system comprising means establishing a substantially constant magnetic field, a magnetically responsive armature pivotally mounted within the zone of influence of said field, and a pair of co-axially arranged actuating windings jointly controlling the movement of said armature, and means varying the current in each of said windings in accordance with the thing being indicated, said windings being adapted to magnetically oppose each other.

13. An electro-magnetic indicating system comprising means establishing a substantially constant magnetic field, a magnetically responsive armature pivotally mounted within the zone of influence of said field, a pair of concentrically and co-axially arranged actuating windings jointly controlling the movement of said armature, said windings being magnetically opposed to each other, and means controlling the energization of one of said windings in accordance with changes in the thing to be indicated in such manner that the energization of said controlled winding shall also be proportionately responsive to changes in the voltage of the source of electrical energy, and means correspondingly changing the energization of the other winding in inverse relation to the first winding.

14. In an indicating system, the combination of a source of energy, a pivotally mounted armature of the magnetic vane type, an indicating member operatively connected to the pivotally mounted armature, means for producing a relatively constant exciter field, a bridge resistance, a slidable contact for the resistance, actuating coils creating a magnetic field varying from like to unlike polarity with respect to a given pole of the relatively constant exciter field, said actuating coils being controlled by the co-operating bridge resistance having its slidable contact connected by a lead to a terminal common to two ends of the separate actuating coils, the two other ends of the actuating coils being connected to opposite ends of the co-operating bridge resistance, said bridge resistance being connected by leads respectively extending from its opposite ends to the terminals of the energizing source, said armature being controlled by and moved with respect to the resultant magnetic fields generated by said actuating coils and said exciter field.

15. An indicating instrument system comprising means producing a magnetic field of substantially constant magnetic intensity, solenoid means producing a reversible magnetic field transversely of the first field and combining therewith to produce a resultant magnetic field, a pivotally mounted armature of the magnetic vane type acted upon by said resultant field to swing said armature from one exterme position through a multiplicity of intermediate indicating positions to the other extreme position, and means progressively changing the intensity and direction of said reversible magnetic field from a maximum in one direction to a corresponding maximum in the other direction in response to corresponding changes in the thing being indicated, the resultant magnetic field being of greatest intensity when the armature is at each end of its range of movement and being of minimum intensity for an intermediate position of the armature, said means for changing the reversible field comprising a resistance unit connected at each end to the system, and a contact member movable therealong in response to changes in the thing being indicated electrically connected to said solenoid means.

STRATFORD B. ALLEN.
LORNE ROBERT SUTHERLAND.